UNITED STATES PATENT OFFICE.

AURELIUS J. SWAYZE, OF GREAT MEADOWS, NEW JERSEY.

EXTRACTION OF POTASSIUM COMPOUNDS FROM FELDSPAR.

No. 862,676.  Specification of Letters Patent.  Patented Aug. 6, 1907.

Application filed March 23, 1906. Serial No. 307,696.

*To all whom it may concern:*

Be it known that I, AURELIUS J. SWAYZE, a citizen of the United States, residing at Great Meadows, in the county of Warren and State of New Jersey, have invented certain new and useful Improvements in Processes of Treating Feldspar, of which the following is a specification, reference being had therein to the accompanying drawing.

This invention provides a process of expeditiously treating feldspar whereby it is rendered readily decomposable and silica, alumina, and potash may be separated therefrom.

Potash-feldspar in the naturally crystalline form as orthoclase is insoluble or but slightly soluble in solutions of caustic alkali. However, when feldspar (orthoclase) is highly heated in the form of a coarse powder or small particles, it is converted into an amorphous state, and it is then capable of being decomposed by a solution of a compound of potassium at a boiling or high temperature. I have also found that the amorphous feldspar is more readily decomposed in a solution of a potassium compound under pressure.

In performing my process, the orthoclase feldspar alone is crushed or reduced to small particles or a coarse powder. The material is next heated on the bed of a furnace, or in any other suitable manner, until the feldspar is converted from a crystalline to an amorphous state. The amorphous feldspar is next transferred to a boiler, or other suitable closed vessel, and mixed with a solution of a compound of potassium, preferably with an aqueous solution of caustic potash, the solution being of specific gravity of about one and two or three tenths. The mixture is then heated sufficiently to produce and maintain a high pressure in the vessel, and the heating continued until the solution attains a specific gravity of about one and seven-tenths, when it is saturated with the decomposed feldspar. The solution is next withdrawn from the vessel, and the elements separated by means well known to the art.

Soluble potassium silicate and aluminate are present in the solution, and silica, alumina, and carbonate of potash are easily recoverable therefrom for commercial purposes, and the carbonate being also available for conversion to hydrate susceptible of use in the performance of this process.

Having thus described my invention, what I claim as new, and desire to secure by Letters Patent, is—

1. The process of treating feldspar which comprises the application of heat to the feldspar until it is converted from a crystalline to an amorphous condition, and decomposing the amorphous feldspar in an alkaline solution of a compound of potassium.

2. The process of treating feldspar which comprises the application of heat to the feldspar in a crushed state until it is converted from a crystalline to an amorphous condition, and decomposing the amorphous feldspar in a solution of caustic potash.

3. The process of treating feldspar which comprises the application of heat to the feldspar in a crushed state until it is converted from a crystalline to an amorphous condition, mixing the amorphous feldspar with a strong solution of caustic potash, and heating the mixture under pressure in a closed vessel.

4. The process of treating feldspar which comprises the application of heat to the feldspar alone until it is converted from a crystalline to an amorphous condition, and decomposing the amorphous feldspar in an alkaline solution of a compound of potassium.

5. The process of treating feldspar which comprises the application of heat to the feldspar alone until it is converted from a crystalline to an amorphous condition, and forming a solution containing potassium silicate and aluminate by heating the feldspar in an alkaline solution of a compound of potassium.

6. The process of treating feldspar which comprises the application of heat to feldspar alone in a crushed state until it is converted from a crystalline to an amorphous condition, mixing the amorphous feldspar with a strong solution of caustic potash, and forming a solution of potassium silicate and aluminate by heating the mixture under pressure in a closed vessel.

In testimony whereof I affix my signature in presence of two witnesses.

AURELIUS J. SWAYZE.

Witnesses:
JOHNSON R. FLUMERFELT,
VIRGINIA SWAYZE.